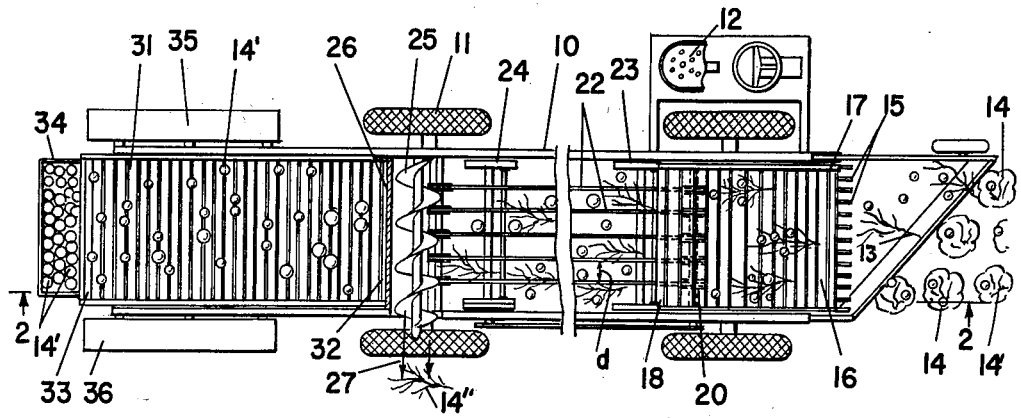
FIG. I.
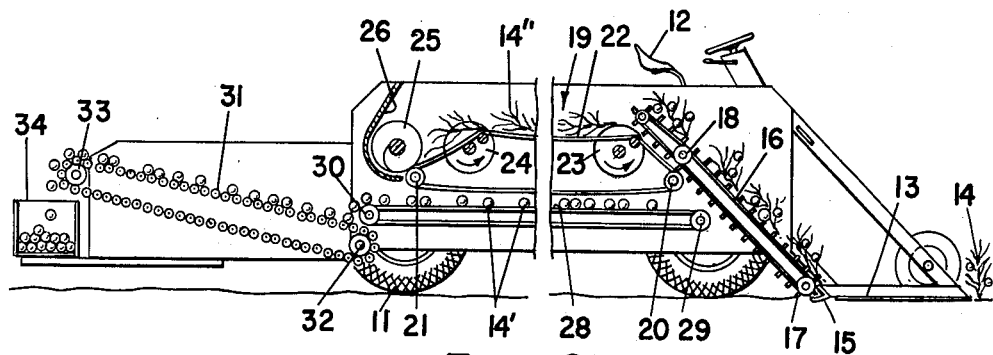
FIG. 2.
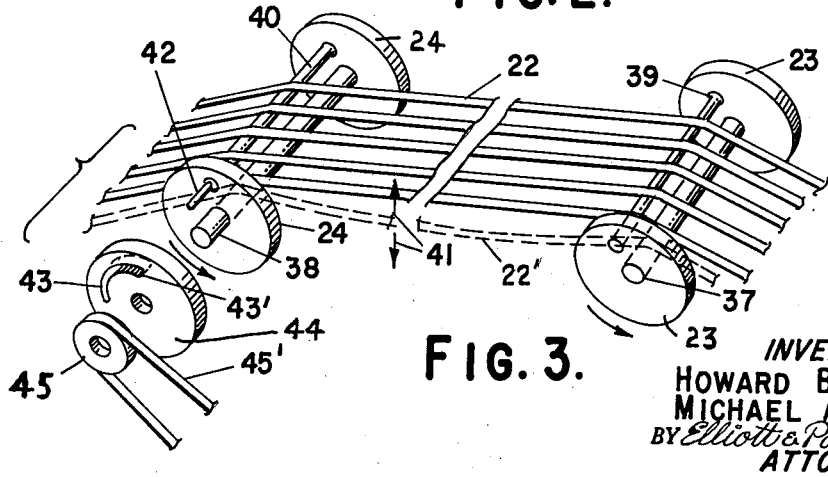
FIG. 3.
INVENTORS
HOWARD B. PETO
MICHAEL AYALA
BY Elliott & Pastoriza
ATTORNEYS

United States Patent Office 3,070,944
Patented Jan. 1, 1963

3,070,944
HARVESTING APPARATUS
Howard B. Peto, Saticoy, and Michael Ayala, Oxnard, Calif., assignors of sixteen and two-thirds percent to Troeles Udsen, Ventura, Calif.
Filed Oct. 3, 1960, Ser. No. 59,886
4 Claims. (Cl. 56—327)

This invention relates generally to harvesting operations and more particularly to an improved apparatus for separating fruit from its vines in the process of harvesting plants.

Harvesting machines for automatically severing and conveying plants to a suitable mechanism for separating the fruit from its vines have been known for some time and are in wide commercial use today. Many such harvesting devices however are not well adapted to certain types of plants, and as a consequence, manual harvesting operations with respect to these particular plants have continued. Tomatoes are one example of such plants that have heretofore been difficult to harvest by machine and only recently have there been proposed automatic harvesting devices for tomato plants. These proposed devices, however, are relatively complicated as well as expensive.

With the above in mind, it is a primary object of this invention to provide a greatly improved automatic harvesting apparatus, particularly adapted for harvesting tomato plants in which the various harvesting operations are carried out more rapidly and with greater efficiency than has been possible heretofore.

More particularly, it is an object to provide an improved harvesting apparatus incorporating unique shaker means for physically separating the fruit from the vines whereby approximately ten acres of tomato plants may be harvested in one day.

More general objects of the invention are to provide an improved harvesting apparatus which is relatively economical to manufacture as compared to prior art machines capable of performing equivalent operations.

Briefly, these and many other objects and advantages of this invention are attained by providing a movable frame structure including cutting means for severing plants from the ground and shaker means for separating the fruit from the vines. The shaker means includes a plurality of endless looped belts in side-by-side relationship, adjacent belts being spaced from each other by a distance sufficient to permit the plant fruit, such as a tomato, to fall therebetween after becoming separated from the vine. The belts are driven to transport the plants in a given direction and simultaneously effect a rapid up-and-down motion to the end that rapid shaking of the plants is realized to an extent sufficient to separate the fruit from the vines. The fruit itself will fall to a level below the level of the belts onto a suitable collecting means such as a conveyor. The vines in turn are received in a suitable discarding means for disposing of the same.

After separation, the fruit may be passed to a conventional picking table from which undesirable fruit is removed by manual means and the remaining good fruit automatically deposited in a bulk container or any other suitable type of receiving box. The entire operation may be carried on continuously so that relatively large areas may be harvested in a short period of time.

A better understanding of the invention will be had by referring to a preferred embodiment thereof as illustrated in the accompanying drawings, in which, FIGURE 1 is a fragmentary top plan view illustrating in generally schematic form the basic components making up the improved harvesting apparatus of this invention;

FIGURE 2 is a side elevational view partly in cross section taken in the direction of the arrows 2—2 of FIGURE 1; and, FIGURE 3 is an enlarged fragmentary schematic illustration of certain portions of the shaking structure employed in the embodiment of FIGURES 1 and 2.

Referring to both the top plan view of FIGURE 1 and side view of FIGURE 2, the harvesting apparatus comprises a frame structure 10 adapted to be moved over the ground by driving wheels 11 operated by a suitable motor and controls (not shown) from seat 12. The wheels and frame together with the operator's controls may constitute conventional equipment and are not described in detail.

Secured to the forward portion of the frame 10 is an elongated flat steel knife or cutting blade 13 positioned at an angle of approximately 45 degrees as viewed from above and normally disposed sufficiently close to the ground to sever plants 14 from their roots as the machine moves forwardly.

Behind the cutting blade 13 is provided a plurality of generally V-shaped prong structures 15 lying in vertical parallel planes for scooping up the plants and depositing them on a first conveyor belt means 16. The conveyor belt 16 is driven by suitable drive rollers 17 and 18 as shown in both FIGURES 1 and 2 in a conventional manner to transport the severed plants generally upwardly and rearwardly to a given level.

Behind the first conveyor 16 there is provided a shaker means designated generally by the numeral 19 and including suitable driver rollers 20 and 21 for driving a plurality of endless looped belts 22. The belts 22, as shown best in FIGURE 1, are in spaced parallel relationship to each other, adjacent belts being separated by a distance sufficient to permit the fruit 14' from the plants 14, as shown, to fall therebetween whereas the vines 14" of the plant will be supported by the belts. A shaking action is imparted to the belts 22 by suitable pairs of wheels such as indicated at 23 and 24 disposed on opposite sides of the shaking structure. The manner in which these wheels impart shaking action to the belts will become clearer as the description proceeds.

To the rear of the plurality of belts 22, there is provided a collecting and discarding means in the form of a helical screw 25. This structure, upon rotation, will dispose of the various vines 14" from which the fruit 14' has been separated as indicated in FIGURE 1. A shielding structure 26 prevents any of the vines from passing further rearwardly and cooperates with the screw to guide the vines in a lateral direction to discard the same at the side of the structure as indicated by the arrow 27.

Disposed beneath the plurality of belts 22 is a collecting means comprising a second belt type conveyor 28 as shown most clearly in FIGURE 2 driven by suitable rollers 29 and 30. The tomatoes or other fruit falling between the plurality of belts 22 will be collected on the conveyor 28 and transported to the left as viewed in FIGURE 2 to a combination picking table and roller type conveyor 31. The conveyor 31 includes a plurality of rollers such as indicated at 32 and 33 adjacent the ends for gradually transporting the tomatoes 14' upwardly and into a suitable container 34 at the extreme rear of the apparatus. By using the several rollers, dirt is sifted therebetween and will fall to the ground. Preferably the rollers are lined with rubber tubes to avoid damage to the fruit.

As best shown in the plan view of FIGURE 1, there are provided suitable platforms 35 and 36 on either side of the picking table 31 so that three or four men may stand on these platforms and dispose of damaged or undesirable fruit. The good fruit 14' passes on to the container 34 or any other suitable collecting box.

Referring now to FIGURE 3, the details of the shaking mechanism will be described. As shown, the pairs of wheels 23 and 24 are connected by transverse shafts 37 and 38 respectively. These wheel pairs also include additional shafts 39 and 40 eccentrically connected between the opposed faces of the wheels respectively, in positions generally parallel to the shafts 37 and 38 but off-center therefrom. By this arrangement, rotation of the pairs of wheels 23 and 24 will result in the additional shafts 39 and 40 following a circular locus which will raise and lower the belts 22 between the solid and dotted line position 22' as indicated by the arrows 41.

The rotation of the wheels 23 and 24 may be relatively rapid to impart a rapid up-and-down motion on the belts 22 as they are traveling from right to left. Preferably, this rotation is imparted through a coupling pin 42 such as shown on the wheel 24 riding in an arcuate slot 43 in a drive wheel 44. Drive wheel 44 turns freely on the end of shaft 38 when assembled and is itself rotated by any suitable pulley 45 and belt drive 45' as shown. In FIGURE 3, the pulley is shown in exploded view to avoid obscuring the drawing but would ordinarily be concentrically fixed to the face of the wheel 44.

By the foregoing type of drive, the wheel 24 may move faster than the driving wheel 44 when the eccentric shaft 40 passes its highest point and the belts 22 are exerting a downward force thereon. Thus, the pin 42 will move ahead in the slot 43 and will only be engaged by the end 43' of the slot when passing under the shaft 38 preparatory to again lifting the belts. The belts themselves may thus "slap" down on the shaft 38 when the eccentric shaft 40 is free to move rapidly downwardly and this action greatly enhances the shaking action. A similar drive or simple connecting belt may be provided for the wheels 23 but are not shown in FIGURE 3 since the action is the same.

There is thus provided translational movement for the plants on the belts 22 as well as the up-and-down movements simultaneously so that the shaking operation will take place as the plants are generally being transported rearwardly towards the discarding screw structure 25 and the picking table 31.

The operation of the harvesting apparatus will be clear from the above description. With forward movement of the entire frame structure over the ground, the cutting blade 13 will initially sever the plants two to four inches from their roots. Continued forward movement of the harvester will then result in the prongs 15 scooping up the severed plants onto the first conveyor 16. This conveyor then transports the plants up to a given vertical level where they will be received on the shaking belts 22. As mentioned, these belts serve to convey the plants from the first conveyor 16 towards the helical screw 25 and picking table 31 simultaneously effecting a shaking action thereon as a consequence of the eccentric shafts 39 and 40, as described in connection with FIGURE 3. This shaking action is sufficient to separate the tomatoes from the vine and permit the former to fall down onto the second conveyor 28 from whence the tomatoes are transported to the picking table conveyor 31. The vines themselves are discarded laterally of the apparatus by the screw 25 as described heretofore. The entire operation is continuous and harvesting can be achieved in a relatively short period of time.

While only one embodiment of the invention has been shown and described, various changes and modifications falling clearly within the spirit and scope of the invention will readily occur to those skilled in the art. The harvesting apparatus is therefore not to be thought of as limited to the particular embodiment set forth merely for illustrative purposes.

What is claimed is:

1. A harvesting apparatus comprising, in combination: a frame structure adapted for movement over the ground and including: cutting means for severing plants on said ground from their roots; a first conveyor means behind said cutting means for conveying said plants upwardly to a given level above the ground; shaker means receiving said plants from said conveyor means for shaking said plants to separate the plant fruit from the plant vines, said shaker means comprising a plurality of continuous belt loops having upper horizontal portions in generally parallel side-by-side relationship, adjacent belts being separated from each other by a distance such that said fruit can fall between said belts, and said vines will be supported by said belts upon separation of said fruit from said vines; rollers spaced at opposite ends of the horizontal portions of said belts, said belts being looped about said rollers and being moved by said rollers to transport said plants away from said first conveyor means; and pairs of wheels spaced adjacent the sides of said shaker means and connected by transverse shafts passing through said continuous belt loops; additional shafts parallel to said transverse shafts and eccentrically connected between opposed faces of said pairs of wheels such that rotation of said wheels revolves said additional shafts over a circular locus to lift periodically said horizontal portions of said belts and thereby provide an up and down shaking action on said plants; and collecting means disposed beneath said shaker means for collecting fruit separated from said vines and falling by gravity through said shaker means.

2. A harvesting apparatus according to claim 1, including a drive means; and a coupling means between said drive means and said wheels for rotating said wheels, said coupling means permitting free motion of said wheels when said additional shafts are moving downwardly under the weight and tension of said belts.

3. A harvesting apparatus according to claim 1, including discarding means for collecting and discarding said vines from said shaker means.

4. A harvesting apparatus according to claim 1, in which said collecting means comprises a second conveyor means for moving said fruit from beneath said shaker means.

References Cited in the file of this patent

UNITED STATES PATENTS

| | | |
|---|---|---|
| 1,232,052 | Landahl | July 3, 1917 |
| 1,893,938 | Ghent | Jan. 10, 1933 |
| 2,269,298 | Widuch | Jan. 6, 1942 |
| 2,943,430 | Carruthers | July 5, 1960 |